US012092398B2

(12) United States Patent
Ozeki et al.

(10) Patent No.: US 12,092,398 B2
(45) Date of Patent: Sep. 17, 2024

(54) FREEZE-DRYING DEVICE AND FREEZE-DRYING METHOD

(71) Applicant: ULVAC, INC., Kanagawa (JP)

(72) Inventors: Tomomitsu Ozeki, Kanagawa (JP); Tsuyoshi Yoshimoto, Kanagawa (JP); Yoichi Ohinata, Kanagawa (JP)

(73) Assignee: ULVAC, INC., Kanagawa (JP)

( * ) Notice: Subject to any disclaimer, the term of this patent is extended or adjusted under 35 U.S.C. 154(b) by 0 days.

(21) Appl. No.: 18/569,435

(22) PCT Filed: Jul. 12, 2021

(86) PCT No.: PCT/JP2021/026186
§ 371 (c)(1),
(2) Date: Dec. 12, 2023

(87) PCT Pub. No.: WO2023/286137
PCT Pub. Date: Jan. 19, 2023

(65) Prior Publication Data
US 2024/0263876 A1 Aug. 8, 2024

(51) Int. Cl.
*F26B 5/06* (2006.01)
*F26B 5/04* (2006.01)

(52) U.S. Cl.
CPC ................ *F26B 5/06* (2013.01); *F26B 5/044* (2013.01)

(58) Field of Classification Search
CPC .................................. F26B 5/06; F26B 5/044
(Continued)

(56) References Cited

U.S. PATENT DOCUMENTS 3,192,643 A * 7/1965 Rieutord ................... F26B 5/06 34/92
4,547,977 A * 10/1985 Tenedini ................... F26B 5/06 236/78 D
(Continued)

FOREIGN PATENT DOCUMENTS

JP 2007-524066 A 8/2007
JP 2008-128585 A 6/2008
(Continued)

OTHER PUBLICATIONS

International Search Report for PCT Patent App No. PCT/JP2021/026186 (Sep. 28, 2021).
(Continued)

*Primary Examiner* — Stephen M Gravini
(74) *Attorney, Agent, or Firm* — Future IP LLC; Tomoko Nakajima

(57) ABSTRACT

A freeze-drying apparatus includes a freeze-drying chamber in which an object to be dried using water as a solvent is disposed, a collection chamber provided with a cold trap which connects with the freeze-drying chamber to condense and collect water vapor generated from the object to be dried, measuring devices which measure a state quantity of at least one of the object to be dried, an inside of the freeze-drying chamber, and an inside of the collection chamber, and a determining unit which determines a water vapor mass flow rate based on the state quantity measured by each measuring device, in which the determining unit has measurement models performed to observe the water vapor mass flow rate, and while each measuring device measures the state quantity, a set based on which the water vapor mass flow rate is determined with superiority at the time of the determination is selected.

7 Claims, 5 Drawing Sheets

(58) Field of Classification Search
USPC ........................................................ 34/92, 287
See application file for complete search history.

(56) References Cited

U.S. PATENT DOCUMENTS

| | | | | | |
|---|---|---|---|---|---|
| 6,163,979 | A * | 12/2000 | Oetjen | F26B 5/06 34/286 |
| 6,233,841 | B1 * | 5/2001 | Beach | F26B 19/005 34/418 |
| 6,971,187 | B1 * | 12/2005 | Pikal | F26B 5/06 34/92 |
| 8,800,162 | B2 * | 8/2014 | Velardi | F26B 5/06 34/298 |
| 9,170,049 | B2 * | 10/2015 | Fissore | F26B 5/06 |
| 10,451,346 | B1 * | 10/2019 | Nguyen | F26B 5/044 |
| 11,435,140 | B2 * | 9/2022 | Tanaka | F26B 9/063 |
| 11,486,640 | B2 * | 11/2022 | Thompson | F26B 21/10 |
| 11,744,257 | B1 * | 9/2023 | Haddock | F26B 5/06 426/384 |
| 11,957,790 | B1 * | 4/2024 | Harkins, Jr. | F26B 5/06 |
| 2009/0107000 | A1 | 4/2009 | Oetjen | |
| 2014/0026434 | A1 * | 1/2014 | Sawada | F26B 5/06 34/524 |
| 2018/0306763 | A1 | 10/2018 | Brucker et al. | |
| 2023/0168034 | A1 * | 6/2023 | Uematsu | F26B 5/042 34/288 |

FOREIGN PATENT DOCUMENTS

| | | | | | |
|---|---|---|---|---|---|
| JP | 2011-252654 | A | | 12/2011 | |
| JP | 5094372 | B2 | | 12/2012 | |
| KR | 20220129088 | A | * | 9/2022 | |
| NL | 2026826 | B1 | * | 6/2022 | F26B 11/028 |
| TW | 202206763 | A | * | 2/2022 | F26B 5/065 |
| WO | WO2012/108470 | A1 | | 8/2012 | |
| WO | WO2019/199710 | A1 | | 10/2019 | |
| WO | WO-2021158759 | A2 | * | 8/2021 | A61K 9/19 |
| WO | WO-2022030055 | A1 | * | 2/2022 | F26B 5/065 |
| WO | WO-2022096524 | A1 | * | 5/2022 | F26B 11/028 |

OTHER PUBLICATIONS

International Preliminary Report on Patentability for PCT Patent App No. PCT/JP2021/026186 (Jan. 25, 2024).

* cited by examiner

FREEZE-DRYING DEVICE AND FREEZE-DRYING METHOD

This application is a national stage filing under 35 U.S.C. § 371 of PCT Patent Application No. PCT/JP2021/026186, filed Jul. 12, 2021, which is incorporated by reference.

TECHNICAL FIELD

The present invention relates to a freeze-drying apparatus including a freeze-drying chamber in which an object to be dried using water as a solvent is disposed and a collection chamber provided with a cold trap that communicates with the freeze-drying chamber to condense and collect water vapor generated from the object to be dried, and a freeze-drying method, and more particularly, a freeze-drying apparatus and a freeze-drying method capable of evenly determining a water vapor mass flow rate, which is a control index of a dry state of the object to be dried.

BACKGROUND ART

For example, this type of freeze-drying apparatus is used to fill a container such as a vial with an aqueous solution (an object to be dried having water as a solvent and a drug as a solute) and cools the container under atmospheric pressure to solidify the solvent from a liquid phase to a solid phase (freezing step), sublimate this solidified solvent from the solid phase to the gas phase (drying step), and obtain a solute-dried body (hereinafter, also referred to as "cake") in the container. In this drying step, a sublimation surface on which the solidified solvent sublimates moves from a surface layer to a lower layer of the object to be dried in the container (primary drying), and when the sublimation surface reaches a bottom surface of the container, moisture (for example, bound water) contained in the dried body is desorbed (secondary drying). Among the objects to be dried, when there is a large amount of moisture remaining in the dried body, stability of the drug may be impaired or quality thereof may be deteriorated. Therefore, when the dried body has a predetermined residual moisture amount, it is important to ensure that the drying step is completed.

In the related art, for example, Patent Literature 1 is known, in which a freeze-drying chamber includes a first vacuum gauge that can measure a total pressure independently of a gas type and a second vacuum gauge which can measure the total pressure using heat conduction and in which a measurement indicated value differs depending on the gas type, and the measurement indicated value of the first vacuum gauge is compared with the measurement indicated value of the second vacuum gauge, and a time when a difference between the measurement indicated values converges to the minimum is an end point (a time when the predetermined residual moisture amount is reached) of the drying step. In this case, in the process of the primary drying, since the total pressure in the freeze-drying chamber is about the same as a partial pressure of water vapor, there is almost no difference in measurement indicated values between the first vacuum gauge and the second vacuum gauge until near the end point of the primary drying, but in the subsequent secondary drying step, there is a difference in the measured indicated values between the total pressure and the partial pressure of water vapor. In such an environment, this means is useful in terms of detecting the end point of the drying step, and it can be used an appropriate measurement model to observe water vapor mass flow rate (the residual moisture amount of the dried body which is a product) serving as a control index for the dry state of the object to be dried, by using the difference in measurement indicated values. However, in an environment where trial freeze-drying is being carried out (for example, when the object to be dried is installed in a freeze-drying apparatus at a ratio of one-thousandth), from the beginning of the process of the primary drying, the total pressure in the freeze-drying chamber illustrates a measurement indicated value that is different from the partial pressure of water vapor. Other than the conditions implied as described above, there is a problem that the dry state of the object to be dried cannot be consistently controlled from the beginning of drying to the predetermined residual moisture amount. In other words, when there is a difference between the total pressure of the drying chamber and the partial pressure of water vapor, as in the environment where the trial freeze-drying is carried out, a mass flow rate can be measured, but under other conditions, it is not possible to measure the mass flow rate from a high sublimation speed to a low sublimation speed.

In addition, as another method for controlling a dry state of an object to be dried, a method is considered, which includes providing a measuring device for measuring weight of a shelf board on which the object to be dried is placed in a freeze-drying chamber, calculating a sublimation speed of a solvent from a change in the weight of the shelf board per unit time, and controlling, based on this calculated sublimation speed, the dry state of the object to be dried from an initial stage of drying until a dried body, which is a product, reaches a predetermined residual moisture amount. However, when the weight of the object to be dried placed on the shelf board is light (the number of containers filled with the aqueous solution is small), the amount of weight change of the shelf board per unit time is small, and thus, the amount of weight change cannot be accurately measured. Then, in the process of the secondary drying in which the sublimation speed of the solvent is reduced, it is more difficult to measure the amount of weight change. Therefore, depending on the weight of the object to be freeze-dried, the dry state of the object to be dried may not be accurately controlled. In addition, by providing a weight measurement mechanism in the freeze-drying chamber, it is difficult to make a configuration inside the freeze-drying chamber to a sterilizable configuration, and there are obstacles such as a factor of thermal resistance to the object to be dried. In this way, in the related art, up to a region (for example, the region where the water vapor mass flow rate decreases to about 1/10000) where the water vapor mass flow rate decreases as the drying of the object to be dried progresses, there is no good method for continuously determining the water vapor mass flow rate with the required resolution for a measured value, and thus, development of a freeze-drying apparatus capable of continuously determining the water vapor mass flow rate is desired.

CITATION LIST

Patent Literature

Patent Literature 1: Japanese Patent No. 5094372

SUMMARY OF INVENTION

Technical Problem

In view of the above points, an object of the present invention is to provide a freeze-drying apparatus and a freeze-drying method capable of evenly determining a water vapor mass flow rate, which is a control index of a dry state of an object to be dried.

Solution to Problem

In order to solve the above problems, according to an aspect of the present invention, there is provided a freeze-drying apparatus including: a freeze-drying chamber in which an object to be dried using water as a solvent is disposed; a collection chamber provided with a cold trap which communicates with the freeze-drying chamber to condense and collect water vapor generated from the object to be dried; a plurality of measuring devices which measure a state quantity of at least one of the object to be dried, an inside of the freeze-drying chamber, and an inside of the collection chamber according to sublimation of the water vapor from the object to be dried; and a determining unit which determines a water vapor mass flow rate based on the state quantity measured by each measuring device, in which the determining unit has a plurality of measurement models performed to observe the water vapor mass flow rate, and while each measuring device measures the state quantity, from sets obtained by combining a measured value measured by each determining unit and each measurement model corresponding to the measured value, a set based on which the water vapor mass flow rate is determined with superiority at the time of the determination is selected, and the water vapor mass flow rate is obtained from this selected measured value and the measurement model corresponding to the selected measured value.

Here, the "state quantity" referred to in the present invention includes physical quantities such as a pressure (total pressure (Pa), partial pressure of water vapor (Pa), and a partial pressure (Pa) of compensating gas (nitrogen gas or argon gas) introduced into, for example, the collection chamber during drying), weight (g) of the object to be dried, and water vapor concentration (mol/$m^3$ or kg/$m^3$). Further, the "measurement model" refers to a theoretical equation for calculating the water vapor mass flow rate using the measured value (state quantity) of each measuring device, and calculates(observes) the water vapor mass flow rate from the state quantity measured by the measuring device by logical calculation processing (for example, when "Pa" is substituted as an input value, the theoretical equation (measurement model) calculates an output value with "g/s", which is a unit of a mass flow rate). That is, the present invention is characterized in that it continues to select a set for observing (calculating) the mass flow rate from some physical quantities. For example, the superiority of each set is confirmed by providing a measuring device for measuring the pressure (total pressure, partial pressure of water vapor) as a state quantity in the freeze-drying chamber or the collection chamber, performing an experiment using a standard substance which can confirm the mass flow rate as a reference for flowing out from the object to be dried in advance, and experimentally obtaining a distribution of a state quantity measured for each mass flow rate, a value obtained by applying the measurement model to the state quantity, or a value in a process of reaching the measurement model. When the mass flow rate flowing out from the object to be dried can be simulated, other means may be used. For example, a mass flow meter may be provided to allow the water vapor mass to flow out, or pure water may be used as the object to be dried, a weight change per unit time may be measured, and this value may be used as the water vapor mass flow rate. That is, there is no limitation on the method as long as a reference mass flow rate can be obtained. Moreover, the distribution can also be obtained in advance by simulation. The unit of the value used for the distribution is not limited to the mass flow rate, and may be a unit appearing in the result during the calculation of the measurement model.

For a combination (set) of a plurality of measurement models (theoretical equations) for calculating the mass flow rate (dm/dt) from the distribution obtained in this way and the measured values measured by each measuring device corresponding to the measurement model, the superiority between the respective sets can be clarified by determining the superiority using weight and storing a result illustrating this superiority as a correspondence table. Specifically, the correspondence table (map) that enables it to continue to select a set that is relatively superior to the water vapor mass flow rate at the time of measurement from the set of each measured value and each measurement model is stored in the determining unit in advance. Using this correspondence table, the water vapor mass flow rate can be observed (calculated) from the combination of the selected measurement model and the measured values measured by the measuring device.

In the above distribution, a portion of a population of each "state quantity" inherent in the freeze-drying apparatus is used as the measured value by a measuring device, a plurality of mass flow rates calculated by applying the measurement model to the measured value are used as samples, and the distribution is expressed as a distribution representing a correlation between the samples and the reference mass flow rate. For each of these samples, results of processing and determination using weights such as obtaining a correlation coefficient for a certain water vapor mass flow rate range (section) are stored in the determining unit as the correspondence table. Specifically, the superiority or inferiority corresponding to a water vapor mass range is stored in the determining unit in advance, and thus, in a process in which the water vapor mass flow rate decreases as the drying of the object to be dried progresses, it is possible to switch the set of the measuring device used for the measurement and the measurement model as a mathematical model. For example, the set with the highest correlation coefficient can be selected from the correspondence table. In this case, the correspondence table is stored, for example, as a set of threshold values. In addition, a threshold value for switching from one set to another set is also given by using weights between the samples. An example of the weighting is to take a midpoint of a confidence interval that overlaps with each other in the measured values (state quantities) from the measuring device used in each measurement model. This midpoint is the threshold value. In addition, it is conceivable that the threshold value is a point where a fluctuation amount (slope) of the water vapor mass flow rate in this overlapping section is the same (for example, ±5%). An output of the water vapor mass flow rate may be subjected to a process of multiplying by a predetermined coefficient so as to ensure the continuity of the determination of the water vapor mass flow rate. Then, when the object to be dried is actually dried in the drying step, the determining unit selects the set of the combination of the measured value and the measurement model (measurement model used for determining the water vapor mass flow rate) corresponding to the measured value from the correspondence table according to each input value of the state quantity measured by each measuring device, and continuously observes(calculates) the water vapor mass flow rate from the selected measured value and the measurement model corresponding to the selected measured value.

As described above, in the present invention, in the process (situation) in which the water vapor mass flow rate decreases as the drying of the object to be dried progresses, the set of the suitable measured value and the measurement model corresponding to the measured value is selected each time, and thus, the water vapor mass flow rate can be continuously obtained while having a required resolution with respect to the determined value. As a result, it is possible to evenly determine the water vapor mass flow rate which is the control index for the dry state of the object to be dried.

Meanwhile, in an initial stage of the drying, the water vapor has a dominant gas composition in the freeze-drying chamber and the collection chamber. In the present invention, as in the conventional example, in addition to measuring the total pressure as the state quantity of the freeze-drying chamber and the collection chamber, the partial pressure of the water vapor of at least one of the freeze-drying chamber and the collection chamber is added to the state quantity. When a configuration is adopted in which the measuring device for measuring the partial pressure of water vapor is provided at two or more locations at least one of the freeze-drying chamber and the collection chamber at intervals, it is advantageous because the water vapor mass flow rate can be determined evenly by a simple method of installing a device for measuring the pressure and the partial pressure of the water vapor in a freeze-drying chamber or a collection chamber.

Here, in general, advection and a diffusion state of the water vapor in the drying step are defined by a low temperature surface (for example, an adsorption surface of the cold trap), a source (for example, when the object to be dried is disposed in a container such as a vial filled with an aqueous solution in which a drug is dissolved, an opening portion of the container) of the water vapor, and a surrounding environment. In the drying step of the freeze-drying apparatus, the water vapor hardly flows out of a streamline (outside a system) from the source to the adsorption surface of the cold trap. However, since a surface state (particularly, surface temperature) of the low temperature surface changes (is not stable) with time due to the adhesion of water molecules, or the like, there is a concern that an error may occur due to the advection and diffusion state of the water vapor changing more than expected. In the present invention, it is preferable that each measuring device for measuring the partial pressure of the water vapor is provided in a range in which the total pressure is different in at least one of the freeze-drying chamber and the collection chamber.

The “total pressure being different” means that conductance (resistance) is included in a space in a path of the streamline from the low temperature surface to the source of water vapor, and even when the freeze-drying chamber and the collection chamber are formed so as to form a single chamber, in general, in shelves on which the vials are placed, a shelf closest to the low temperature surface has a condition that controls conductance, so it can be separated by this portion. That is, even when the measuring device measures the same physical quantity, when the measuring devices are disposed in this way, a physical phenomenon seen from the streamline can be measured in different regions, and as a result, the number and arrangement of the measuring devices can be optimized. In other words, when a plurality of samples have the same physical quantity, it is preferable that an element that fluctuates the physical quantity, such as conductance, intervenes between the samples. Hereinafter, the same applies to this purpose, but when two measuring devices for measuring the partial pressure of the water vapor are provided at predetermined positions where a partial pressure difference of 50% or more occurs, the number of measuring devices to be installed in the same manner can be minimized, which is advantageous. That is, even in a case where the two measuring devices for measuring the partial pressure of the water vapor are disposed at the same position in the freeze-drying chamber or the collection chamber at the same total pressure, when the diffusion states (partial pressure of water vapor or volume fraction) of the water vapor are different from each other under the same pressure, the water vapor mass flow rate can be determined using the water vapor mass fraction or volume fraction, the disposition is performed to observe a difference of 50% or more, and thus, the number of measuring devices can be optimized.

By the way, when measuring the partial pressure of the water vapor, as described above, the water vapor from the source moves toward the low temperature surface. Although it is most desirable to dispose the measuring device on the advection streamline from the viewpoint of a mass fraction gradient, a region adjacent to this streamline and a region where water vapor invades due to diffusion are effective as a region for disposing the measuring device. However, since the change in the mass fraction of water vapor is small in this region, there is a concern that the sensitivity cannot be increased as compared with the streamline, and when it deviates from this region, it becomes unsuitable for determining the water vapor mass flow rate. In addition, in general, the mass fraction of water vapor is always close to 1 in the vicinity of the source, and the mass fraction of water vapor is close to 0 in the vicinity of the low temperature surface. If the measuring device is installed in consideration of these factors, the sensitivity of determining the mass flow rate can be increased. When a differential pressure is generated between the freeze-drying chamber and the collection chamber from the initial stage of drying, the water vapor mass fraction in the freeze-drying chamber, which is a high-pressure side region, is approximately 1 in the entire area, and when reaching the collection chamber, the differential pressure becomes the dominant factor rather than the diffusion, and thus, a region where the water vapor mass fraction remains approximately 1 is formed in the collection chamber. After that, as the differential pressure decreases, the region where the mass flow rate is approximately 1 is reduced. Focusing on such a phenomenon, in the present invention, when each measuring device for measuring the partial pressure of the water vapor is provided in a region where the mass fraction of the initial collection chamber is 1 and the value decreases thereafter, effective sensitivity can be secured, which is advantageous. In particular, after it becomes difficult to determine the mass flow rate due to the differential pressure generated between the freeze-drying chamber and the collection chamber, it is advantageous that the same sensitivity can be secured when switching to the measurement model using the partial pressure of the water vapor.

Further, in order to solve the above problems, according to another aspect of the present invention, there is provided a freeze-drying method including: a freezing step of disposing an object to be dried using water as a solvent in a freeze-drying chamber and cooling the object to be dried to solidify the solvent from a liquid phase to a solid phase; and a drying step of sublimating the solidified solvent from the solid phase to a gas phase, in which the drying step further includes a step of measuring a state quantity of at least one of the object to be dried, an inside of the freeze-drying chamber, and an inside of the collection chamber according to sublimation of the water vapor from the object to be dried using a plurality of measuring devices and determining a water vapor mass flow rate using a determining unit based on the state quantity measured by each measuring device, and the determining unit has a plurality of measurement models performed to observe the water vapor mass flow rate in advance, and while each measuring device measures the state quantity, from among sets obtained by combining a measured value measured by each measuring device and each measurement model corresponding to the measured value, a set based on which the water vapor mass flow rate is determined with superiority at the time of the determination is selected, and the water vapor mass flow rate is obtained from this selected measured value and the measurement model corresponding to the selected measured value. In this case, a partial pressure of the water vapor may be used as the state quantity, and the partial pressure of the water vapor may be obtained by a plurality of measuring devices provided at two or more locations at least one of the freeze-drying chamber and the collection chamber at intervals.

DESCRIPTION OF EMBODIMENT

Figure 1:
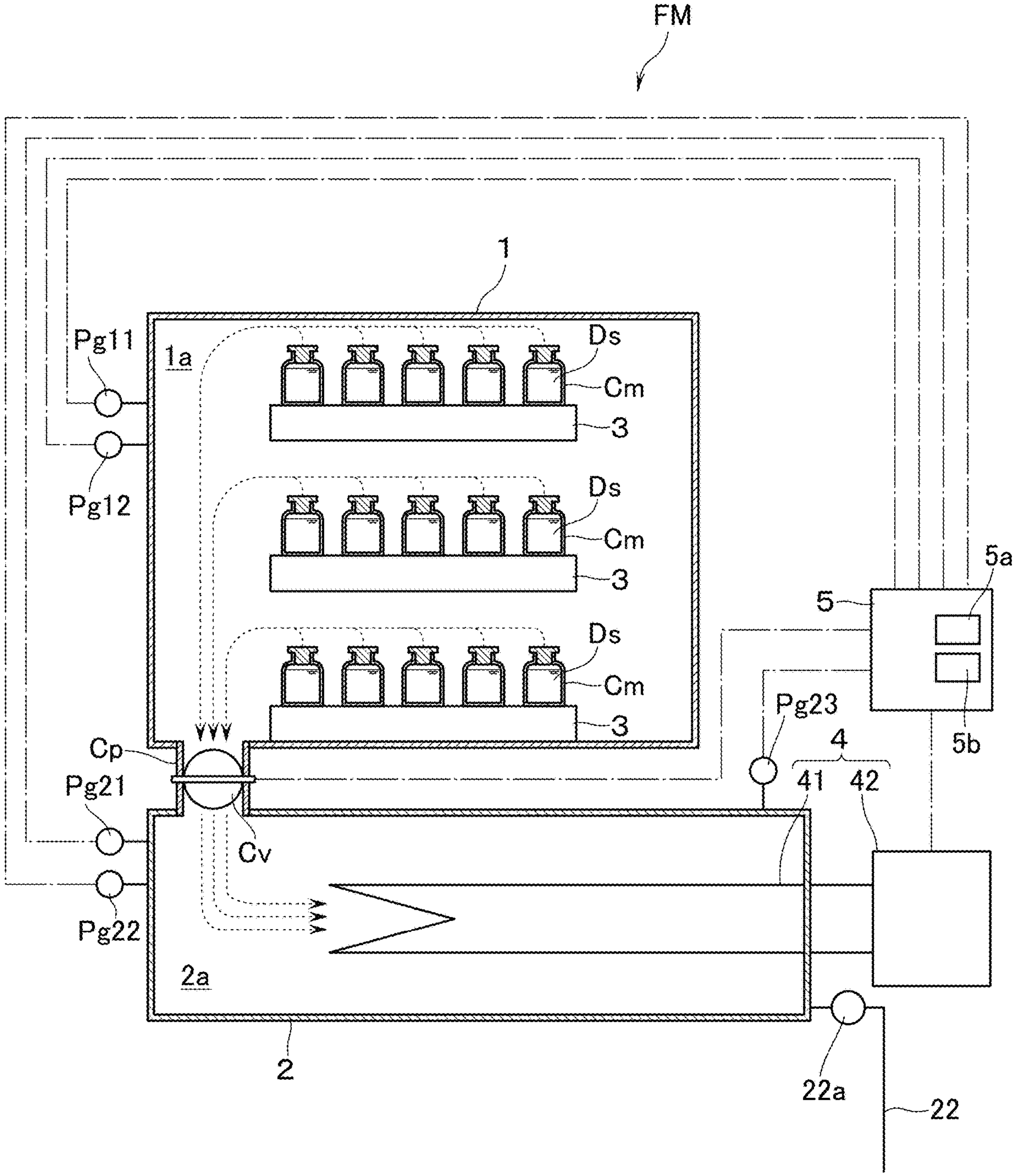
FIG. 1 is a schematic cross-sectional view of a freeze-drying apparatus according to an embodiment of the present invention.

Hereinafter, referring to the drawings, embodiments of a freeze-drying apparatus and a freeze-drying method of the present invention will be described, which can evenly determine a water vapor mass flow rate, which is a control index of a dry state of an object to be dried Ds, taking as an example a case where the object to be dried Ds using the water filling a container Cm as a solvent is freeze-dried. In the following, directions such as "up" and "down" will be described with reference to FIG. 1, which is an installation posture of a freeze-drying apparatus.

With reference to FIG. 1, a freeze-drying apparatus FM of the present embodiment includes a rectangular parallelepiped freeze-drying chamber 1 that defines a freeze-drying chamber(an internal space) 1*a* and a cylindrical collection chamber 2 that defines a collection chamber(an internal space) 2*a*. The collection chamber 2 is connected to the freeze-drying chamber 1 via a connection pipe Cp to which an on-off valve Cv is attached at one end side in a generating line direction. In the freeze-drying chamber 1*a*, shelf boards 3 on which a plurality of containers Cm filled with the objects to be dried Ds are placed are provided in a plurality of stages at intervals in a vertical direction. Although not particularly illustrated and described, each shelf board 3 incorporates a heating/cooling mechanism, and by heating or cooling the shelf board 3 using the heating/cooling mechanism, the object to be dried Ds filling the container Cm can be mainly heated or cooled by heat transfer from the shelf board 3. As the heating/cooling mechanism, a known one such as a resistance heating type heater or a refrigerant circulation path can be used, and thus, detailed descriptions thereof will be omitted here, including a control method for heating or cooling during freeze-drying.

A condensing pipe 41 of a cold trap 4 is provided in the collection chamber 2*a*. Then, a refrigerant is circulated through the condensing pipe 41 by a refrigerator 42 disposed outside the collection chamber 2*a*, and by cooling the condensing pipe 41 to a constant temperature (for example, about −60° C.), it is possible to condense and collect water vapor generated (sublimated) from the coagulated solvent of the object to be dried Ds. An exhaust pipe from a vacuum pump may be connected to the collection chamber 2 so that the inside of the collection chamber 2*a* can be evacuated. A gas introduction pipe 22 for a compensating gas such as nitrogen gas or argon gas is also connected to the collection chamber 2. Then, when a pressure in the freeze-drying chamber 1*a* moves toward a pressure value in the collection chamber 2*a* due to a decrease in the water vapor mass flow rate as the sublimation of water vapor from each object to be dried Ds progresses, by setting a flow rate of a compensating gas introduced into the collection chamber 2*a* by a mass flow controller 22*a* provided in the gas introduction pipe 22 to a mass corresponding to the decrease in the water vapor mass flow rate, an inside of the freeze-drying chamber 1*a* can be maintained at a predetermined pressure (for example, 10 Pa). That is, the pressure in the freeze-drying chamber 1*a* can be maintained at a constant value by reducing a differential pressure by bringing the pressure in the collection chamber 2*a* closer to the predetermined pressure in the freeze-drying chamber 1*a* by the mass of the compensating gas introduced into the collection chamber 2*a*. The reason for maintaining the predetermined pressure is that a heat conduction resistance does not fluctuate. This configuration is preferable in that it does not affect a streamline when the water vapor is advected from a source to the low temperature surface even when measuring the partial pressure of the water vapor, and does not become a variable factor. When the compensating gas is introduced into the freeze-drying chamber 1*a* for the purpose of maintaining the inside of the freeze-drying chamber 1*a* at a predetermined pressure, the partial pressure (concentration) of water vapor is affected by a streamline path of the introduced compensating gas, a complicated measurement model occurs, and thus, it may be difficult to determine the mass flow rate.

Further, for example, the freeze-drying apparatus FM includes a control unit 5 having a memory 5*a* in which a correspondence table (map) described below, a measurement model, and a threshold value when switching the measurement model are stored, and a microcomputer 5*b* in which a measured value of a measuring device described below is input and which calculates the water vapor mass flow rate from a state quantity measured by the measuring device by selecting the measurement model or performing logical operation processing. In this case, the control unit 5 is designed to comprehensively control the operations of the on-off valve Cv, the mass flow controller 22*a*, the heating/cooling mechanism of each shelf board 3, the refrigerator 42, the determining unit, and the like. The memory 5*a* is configured to store only the correspondence table, and the logical operation processing such as distribution acquisition and combination selection can be performed by a microcomputer or the like provided in another device.

Meanwhile, when the frozen object to be dried Ds is dried, a sublimation surface on which a solidified solvent sublimates moves from a surface layer to a lower layer of the object to be dried Ds in the container (primary drying) and the sublimation surface reaches a bottom of the container Cm, moisture (for example, bound water) contained in a dried body is desorbed (secondary drying), and then the object to be dried is dried (drying step), but when the dried body reaches a predetermined residual moisture amount, it is important to surely complete the drying step. Under the implied conditions of this drying step, that is, under the initial drying conditions where a rated quantity of the object to be dried Ds is in the freeze-drying chamber 1_a_, a gas composition occurs in which the water vapor is dominant in the freeze-drying chamber 1_a_ and the collection chamber 2_a_. In addition, in general, the advection and diffusion state of the water vapor during drying is defined by the condensing pipe 41 of the cold trap 4 as a low temperature surface, a top opening of the container Cm filled with the object to be dried Ds, and the surrounding environment, and the water vapor hardly flows out of a streamline (outside a system) from the source to the adsorption surface of the condensing pipe 41 of the cold trap 4. Further, as described above, when the freeze-drying chamber 1 and the collection chamber 2 are connected by the connection pipe Cp, a pressure loss occurs in the connection pipe Cp.

Figure 2A:
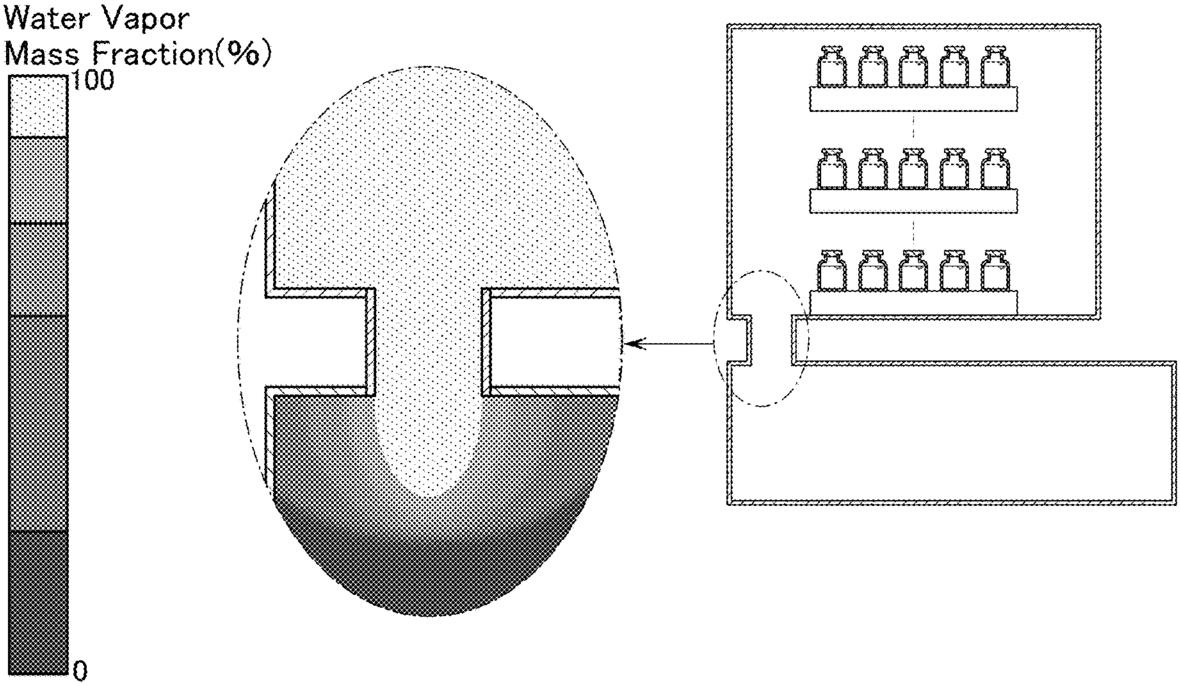
FIG. 2(*a*) is a contour diagram of a water vapor mass fraction near a connection pipe in an initial stage of drying, and FIG. 2(*b*) is a contour diagram of the water vapor mass fraction near the connection pipe as the drying progresses.
Figure 2B:
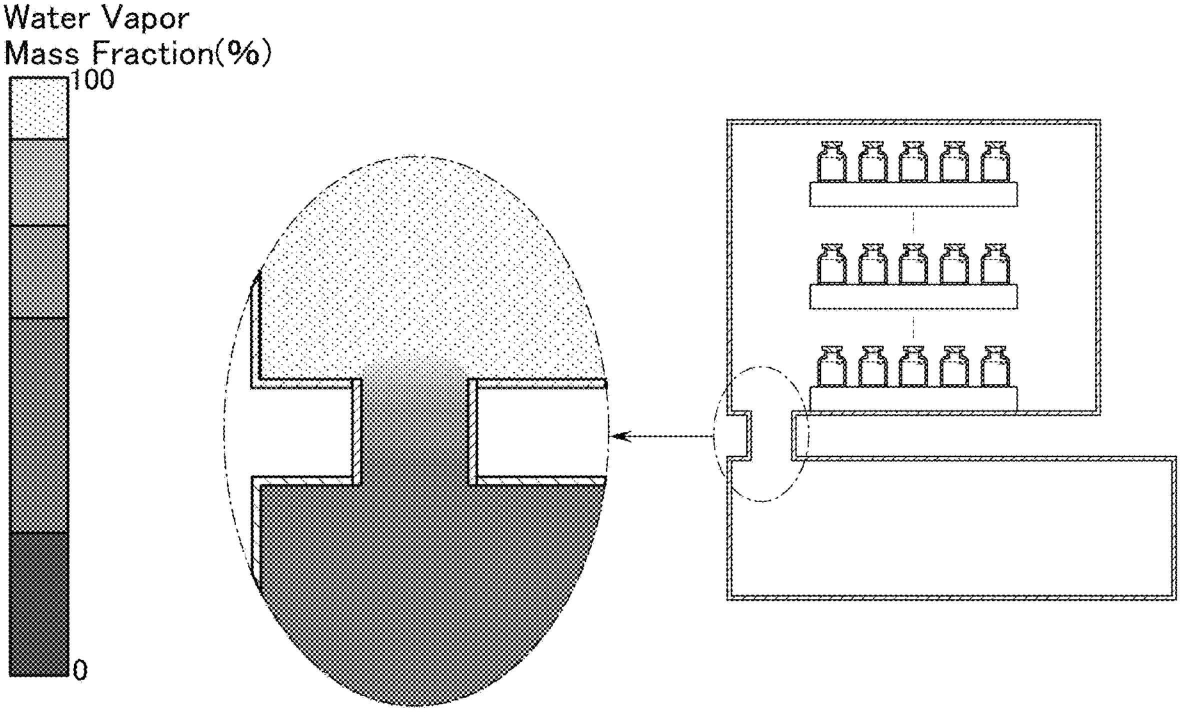

Meanwhile, when the distribution of the partial pressure of the water vapor in the collection chamber 2_a_ is simulated from the initial stage of drying to the predetermined residual moisture amount, as illustrated in FIG. 2, particularly, in a region (one end portion in a generating line direction of the collection chamber 2) located in the collection chamber 2_a_ directly under the connection pipe Cp, although the water vapor mass fraction has a distribution at the initial stage of drying (refer to FIG. 2 (_a_)), the water vapor mass fractions in the collection chamber 2_a_ gradually become equivalent (refer to FIG. 2 (_b_)). Based on the above, one example is considered, in which the measuring device for measuring the total pressure and the partial pressure of the water vapor as the state quantities are appropriately disposed in the freeze-drying chamber 1_a_ and the collection chamber 2_a_, the difference in the total pressure between the freeze-drying chamber 1_a_ and the collection chamber 2_a_, the partial pressure (concentration) of the water vapor in the region located directly under the connection pipe Cp in the collection chamber 2_a_, and the partial pressure (concentration) of the water vapor in the collection chamber 2_a_ are measured, respectively, and from among sets obtained by combining a measured value measured by each measuring unit and each measurement model corresponding to the measured value, a set based on which the water vapor mass flow rate can be determined with superiority at the time of the determined is selected, and when the water vapor mass flow rate which become the control index of the dry state of the object to be dried Ds is determined from this selected measured value and the measurement model corresponding to the selected measured value, the dry state of the object to be dried Ds can be consistently controlled from the initial stage of drying to the predetermined residual moisture amount by a simple method.

Specifically, the freeze-drying chamber 1_a_ is provided with a first total pressure measuring device Pg11 for measuring the total pressure and a first partial pressure measuring device Pg12 for measuring the partial pressure of the water vapor. As the first total pressure measuring device Pg11, for example, a diaphragm vacuum gauge (capacitance manometer) can be used. As the first partial pressure measuring device Pg12, for example, a mass spectrometer can be used, and the mass spectrometer is disposed to be located on the streamline (in FIG. 1, broken line schematically attached to the freeze-drying chamber 1_a_ and the collection chamber 2_a_) when steam is advected or in a region (diffusion region near the streamline) where the same detection as on the streamline can be performed due to diffusion. Meanwhile, in the collection chamber 2_a_, similarly, a second total pressure measuring device Pg21 which is a diaphragm vacuum gauge and two second partial pressure measuring device Pg22 and Pg23 which are mass spectrometers are provided. The second partial pressure measuring device Pg22 and Pg23 are respectively provided at two locations such as one end side of the collection chamber 2 in the generating line direction which is located on the streamline when the water vapor is advected or the diffusion region near to the streamline, and the other end side of the collection chamber 2 in the generating line direction. A laser gas analyzer (TDLAS) can be used as the first and second partial pressure measuring device Pg12, Pg22, and Pg23, and in this case, the concentration (mol/$m^3$ or kg/$m^3$) of the water vapor measured by the laser gas analyzer may be converted to a pressure (Pa).

In the initial stage of drying, a large amount of water vapor flows from the object to be dried Ds into the freeze-drying chamber 1_a_, and there is a pressure loss in the connection pipe Cp, and thus, a differential pressure is generated between the freeze-drying chamber 1_a_ and the collection chamber 2_a_ due to the movement of water vapor mass. At this time, the water vapor mass fraction in the freeze-drying chamber 1_a_ which is a high-pressure side is approximately 1. The water vapor in the freeze-drying chamber 1_a_ can reach a portion of the collection chamber 2_a_ on the low pressure side almost without being affected by diffusion due to the differential pressure. That is, the differential pressure is a factor that causes a partial region of the collection chamber 2_a_ to have a water vapor mass fraction of about 1. Here, the partial region is an end portion on one side in the generating line direction of the collection chamber 2 located directly under the connection pipe Cp. After that, as the water vapor mass flow rate decreases (the differential pressure also decreases), the partial region where the water vapor mass fraction is approximately 1 is reduced. Focusing on such a phenomenon, when the one second partial pressure measuring device Pg22 is disposed in the region where the initial water vapor mass fraction is 1 and the value decreases thereafter (that is, when the first and second partial pressure measuring devices Pg12 and Pg22 are disposed at two locations at intervals), effective sensitivity can be secured, which is advantageous. In particular, after it becomes difficult to determine the mass flow rate due to the differential pressure generated between the freeze-drying chamber 1_a_ and the collection chamber 2_a_, it is advantageous that the same sensitivity can be secured when switching to the measurement model using the partial pressure of the water vapor.

Next, as described above, the plurality of containers Cm filled with the object to be dried Ds as a standard substance are placed on the respective shelf boards 3, and the object to be dried Ds is freeze-dried experimentally using the freeze-drying apparatus FM equipped with the first and second total pressure measuring devices Pg11 and Pg21 and the first and second partial pressure measuring device Pg12, Pg22, and Pg23. A reference mass flow rate flows out from the object to be dried Ds used in this experiment, and the reference mass flow rate value is obtained by a known method and recorded in the memory 5*a*. Then, in the drying step, the measurement is performed by the first and second total pressure measuring device Pg11 and Pg21, the first partial pressure measuring device Pg12, and the one second partial pressure measuring device Pg22, and the distribution (the distribution of the total pressure value and the partial pressure value corresponding to the magnitude of the reference mass flow rate value) of respective values of the total pressure corresponding to the entire range of the reference mass flow rate value obtained from the standard substance and the partial pressure of the water vapor is obtained. For example, this distribution can be expressed as a scatter plot using a mass flow rate value on a horizontal axis and a pressure value on a vertical axis. Since there are as many pressure values as there are measuring devices Pg11, Pg21, Pg12, Pg22, and Pg23, this distribution is expressed in a six-dimensional space. By applying three theoretical equations (the following equations 1 to 3) for calculating the water vapor mass flow rate (dm/dt), that is, the measurement model to this six-dimensional distribution, the water vapor mass flow rate value of the set in which the measured value and the measurement model are combined is calculated, and the distribution for obtaining the water vapor mass flow rate value is obtained. It should be noted that the distribution may be used to obtain values obtained for some of terms used in the theoretical equation. Hereinafter, Equations 1 to 3 are illustrated as f(1), f(2), and f(3), respectively.

The above series of operations can also be performed by simulation. From this distribution obtained in advance, a combination of a plurality of theoretical equations (that is, measurement models) for calculating the mass flow rate (dm/dt) and measured values measured by each measuring devices corresponding to the measurement model can be selected, and as illustrated in Equation 4, a distribution is obtained from the combination of each measured value and the measurement model, weights are used for this distribution to determine which set has an superiority with respect to the mass flow rate value from among the plurality of sets, this determination result is used as the correspondence table, and thus, a combination having a comparative advantage over the water vapor mass flow rate at the time of determination during test or production is selected, and it is possible to observe by calculating the mass flow rate (dm/dt).

$$\frac{dm}{dt} = \frac{\pi a^4}{8\mu\left(L + 0.029\,\frac{dm}{dt}\right)}\,\frac{P_{t1}^2 - P_{t2}^2}{2} \qquad \text{[Equation 1]}$$

Here, a in Equation 1 is a radius [m] of an inner diameter of the connection pipe Cp, L is the length [m] of the connection pipe Cp, p is the water vapor viscosity [Pa·s] (the above should be treated as a constant), $P_{t1}$ is the total pressure [Pa] of the freeze-drying chamber 1*a* measured by the first total pressure measuring device Pg11, and $P_{t2}$ is the total pressure [Pa] of the collection chamber 2*a* measured by the second total pressure measuring device Pg21. In the following equations, unless otherwise noted, the same symbols mean the same as those in Equation 1. Since α and L are values representing the conductance of the connection pipe Cp, when there are obstacles or the like that affect the conductance inside the connection pipe Cp, these values are adjusted in consideration of the influences. In other words, it can be said that Equation 1 can obtain the water vapor mass flow rate using only the total pressure of each of the freeze-drying chamber 1*a* and the collection chamber 2*a* as variables. There are no restrictions on the installation location of each measuring device used by Equation 1 as long as it can be regarded as a separate chamber. In addition, as long as a physical quantity unit of the mass flow rate (dm/dt) represented by each equation is the physical quantity unit to be finally used by using a numerical calculation method such as multiplying by a coefficient, there is no limitation in the acquisition of the distribution, and for example, [Pam$^3$/s], [mol/s], [kg/s], [g/h], or the like may be used. In addition, the purpose of acquiring the distribution is to create a correspondence table, there is no inconvenience when it is possible to make an effective comparison with the reference mass flow rate value using weights, and thus, it may be a physical quantity unit that meets the purpose even when it is not related to the mass flow rate unit. That is, the distribution may include samples that correlate with the reference mass flow rate.

$$\frac{dm}{dt} = -\frac{D_{AB}}{1 - x_{v2}} \times \frac{dC_{v2}}{dx} = -\frac{D_{AB}}{1 - \frac{P_{v2}}{P_{t2}}} \times \frac{C_{v2} - C_{v\_CT}}{l_{2CT}} \qquad \text{[Equation 2]}$$

Here, in Equation 2, $D_{AB}$ is a diffusion coefficient [m$^2$/s] of water vapor in a nitrogen atmosphere, $C_{V\_CT}$ is the water vapor concentration [mol/m$^3$] (obtained by unit conversion from the saturated water vapor pressure [Pa] at the surface temperature of the condensing pipe 41) on the surface of the condensing pipe 41, $I_{2CT}$ is a distance [m] between the surface of the condensing pipe 41 in the collection chamber 2*a* and the second partial pressure measuring device Pg22, $C_{v2}$ is a water vapor concentration [mol/m$^3$] (derived from $P_{v2}$ and $P_{t2}$) at the position of the second partial pressure measuring device Pg22, $P_{v2}$ is the partial pressure [Pa] of the water vapor of the collection chamber 2*a* measured by the second partial pressure meter Pg22. In other words, Equation 2 can calculate the water vapor mass flow rate from one total pressure and one partial pressure as variables (when conditions other than variables can be constants). Here, as long as the total pressures of the freeze-drying chamber 1*a* and the collection chamber 2*a* can be regarded as one, there is no limitation on the installation location of each measuring device used by Equation 2. Further, the distance from the surface of the condensing pipe 41 to the partial pressure measuring device is a distance that follows the streamline, but since the surface position is not uniquely determined, it is treated as an equivalent distance.

$$\frac{dm}{dt} = \frac{D_{AB} \times C_{total}}{L} \times \ln\frac{1 - x_{CT}}{1 - x_{v1}} = \frac{D_{AB} \times C_{total}}{L} \times \ln\frac{P_{t2} - P_{v\_CT}}{P_{t1} - P_{v1}} \qquad \text{[Equation 3]}$$

Here, in Equation 3, $C_{total}$ is the total gas mass concentration [mol/m$^3$], L is a distance [m] between the surface of the condensing pipe 41 and the first partial pressure measuring device Pg12, $X_{CT}$ is a water vapor mole fraction [Pa] (saturated water vapor pressure at the surface temperature of the condensing pipe 41) on the surface of the condensing pipe 41, $X_{v1}$ is a water vapor mole fraction [Pa] in the freeze-drying chamber 1*a* calculated from the total pressure of the freeze-drying chamber 1*a* measured by the first total pressure measuring device Pg11 and the partial pressure of the water vapor in the freeze-drying chamber 1*a* measured by the first partial pressure measuring device Pg12, $P_{t2}$ is the total pressure [Pa] in the collection chamber 2$a$ measured by the second total pressure measuring device Pg21, $P_{v\_CT}$ is a saturated water vapor pressure [Pa] (is the same as $C_{v\_CT}$ [mol/m$^3$] and only the unit is different) at the surface temperature of the condensing pipe 41, and $P_{v1}$ is the partial pressure [Pa] of the water vapor in the freeze-drying chamber 1$a$ measured by the first partial pressure measuring device Pg12. $C_{total}$ is calculated from $P_{t1}$ and $P_{v1}$. In other words, in Equation 3, the water vapor mass flow rate can be calculated from two total pressures or one total pressure and one partial pressure (under a condition that the constant can be other than the variable, when $P_{t2} \approx P_{t1}$ condition or not). Here, as long as the freeze-drying chamber 1$a$ and the collection chamber 2$a$ can be regarded as one, there is no limitation on the installation location of each measuring device used by Equation 3.

[Equation 4]

$$\frac{dm}{dt} = f(n)(x_1, x_2 \ldots x_m) =$$

$$\begin{pmatrix} a_{11}, a_{12} & \ldots & a_{1m} \\ a_{21}, a_{22} & \ldots & a_{2m} \\ \vdots & & \vdots \\ a_{n1} & \ldots\ldots\ldots & a_{nm} \end{pmatrix} \begin{pmatrix} x_1 \\ x_2 \\ \vdots \\ x_m \end{pmatrix} = \begin{pmatrix} a_{11}x_1 + a_{12}x_2 + \ldots + a_{1m}x_m \\ a_{21}x_1 + a_{22}x_2 + \ldots + a_{2m}x_m \\ \vdots \\ a_{n1}x_1 + \ldots\ldots\ldots\ldots + a_{nm}x_m \end{pmatrix}$$

Here, in Equation 4, dm/dt is the water vapor mass flow rate, and f(n) indicates a plurality of measurement model equations performed to observe the water vapor mass flow rate, for example, Equations 1 to 3. When there are three equations, it means that f(1), f(2), and f(3) exist, and the corresponding dm/dt exists. With the intention of omitting these notations, only one Equation 4 is illustrated for convenience, but in reality, there are n pieces of f(n) and the corresponding same number of pieces of dm/dt. The n pieces of dm/dt are obtained as a distribution. This is simulated as FIG. 5. $x_1, x_2, \ldots, x_m$ indicates the state quantity used as a variable by the measurement model equations 1 to 3 measured by the measuring devices Pg11 to Pg23. Then, while the state quantity corresponding to the entire range of the reference mass flow rate, that is, the state quantity is measured by each of the measuring device Pg11 to Pg23, the corresponding dm/dt is obtained from the set obtained by combining the measured values measured by the measuring devices Pg11 to Pg23 and the measurement model equations 1 to 3 corresponding to the measured values, as the distribution. From the dm/dt in this distribution, for example, the best set in the determination point or determination range is selected using the correlation coefficient with the reference mass flow rate value as the weight, the best set is stored in the memory 5$a$ as the correspondence table, and based on this correspondence table, it is possible to select the set based on which the water vapor mass flow rate can be determined with the superiority at the time of actual determination. As a result, the freeze-drying apparatus FM is configured to obtain the water vapor mass flow rate from the selected measured value and the measurement model corresponding to the selected measured value.

Figure 3A:
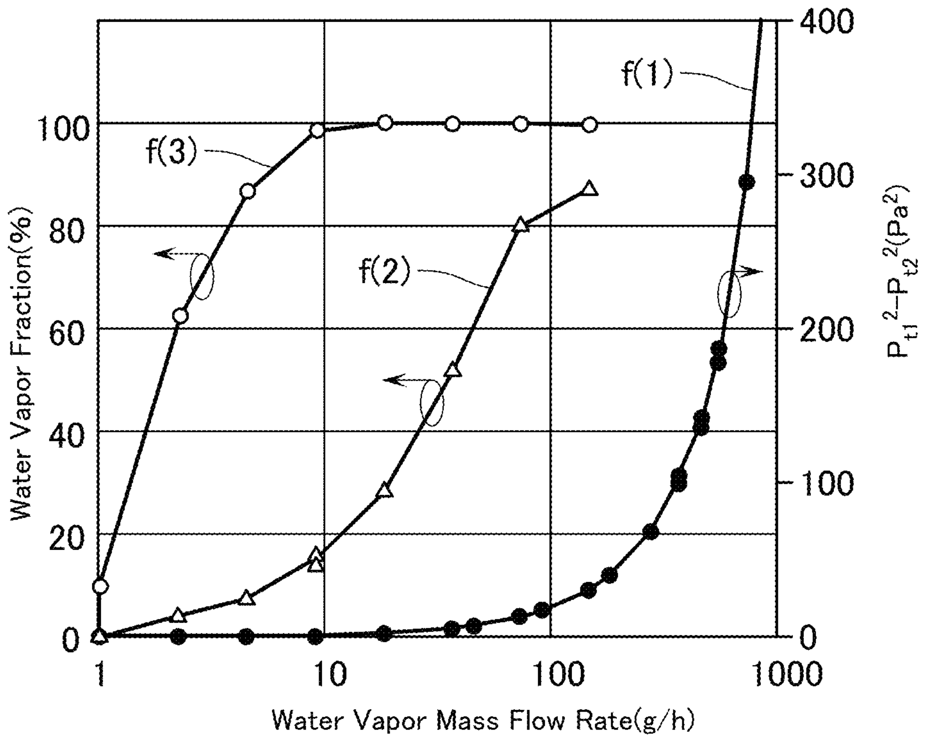
FIG. 3(*a*) is a diagram illustrating a correspondence table for calculating a water vapor mass flow rate, and FIG. 3(*b*) is a diagram describing a threshold value for switching a mathematical model.
Figure 3B:
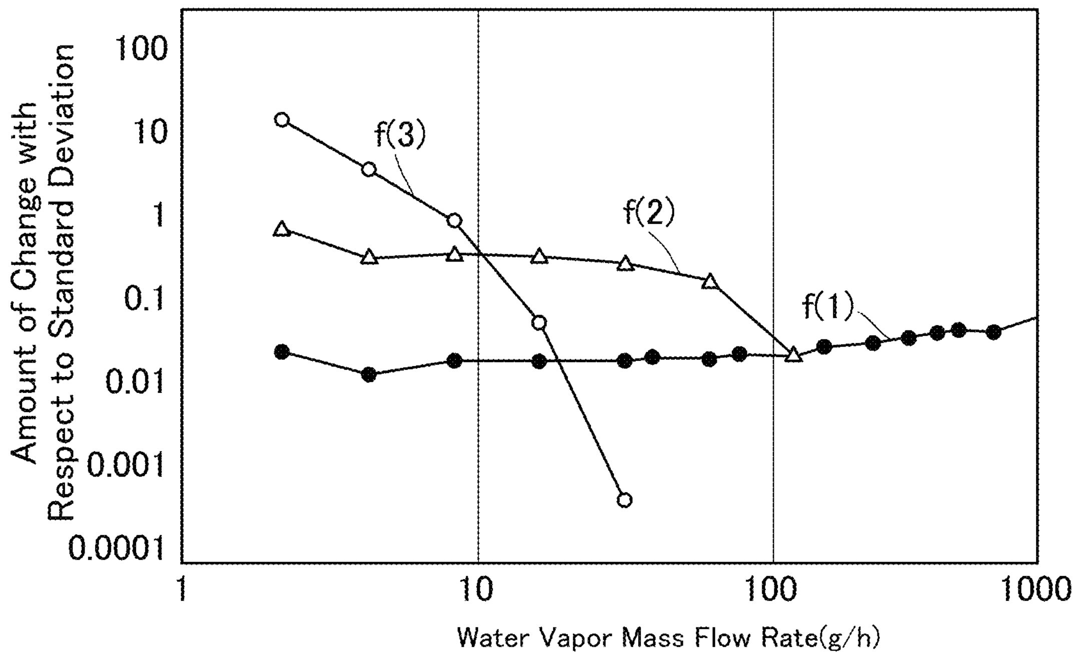

FIG. 3($a$) illustrates a graph in which a horizontal axis is the reference mass flow rate (g/h) of water vapor, a vertical axis is a value $P_{t1}^2 - P_{t2}^2$ obtained from each measuring device and the mass fraction (%) of water vapor, that is, an example of distribution. In curves illustrated in FIG. 3($a$), from right, when a function indicated by –·– is defined as f(1), a function indicated by –Δ– is defined as f(2), and a function indicated by –o– is defined as f(3), $f(1) = P_{t1}^2 - P_{t2}^2$, f(2)=the mass fraction of water vapor in the collection chamber 2$a$, and $f$(3)=the mass fraction of water vapor in the freeze-drying chamber 1$a$. The mass fraction of water vapor can be obtained from the total pressure and partial pressure of each chamber. That is, the measurement models of f(2) and f(3) are the same, and only the measuring devices are different. The description on the right end side of f(2) and f(3) in FIG. 3($a$) is omitted. The distribution illustrated by these sets is treated as the reference mass flow rate of water vapor and a distribution in a four-dimensional space represented by f(1), f(2), and f(3). FIG. 3($a$) illustrates the distribution of this four-dimensional space on a two-dimensional plane. As the number of sets increases or decreases, the order of the space which is the distribution increases or decreases. The weight is used to obtain a correspondence table from this distribution. An example of weight is a correlation coefficient.

In one example, the reference mass flow rate is set to three ranges of a) 1 to 10, b) 10 to 100, and c) 100 to 1000, and the correlation coefficient between the three ranges and f(1), f(2), and f(3) is obtained. From FIG. 3($a$), in the correlation coefficient, f(3)>f(2)>f(1) is obtained in the a) range, f(2)>{f(2)≈f(1)} is obtained in the b) range, and f(1)>f(2)>f(3) is obtained in the c) range. That is, the superiority in a predetermined range can be obtained. This can be used as the correspondence table. In this case, the correspondence table illustrates a relationship between the range and the set. In the above method, the range is fixed, but by using a sufficiently small range, it is possible to continue to select a set which maintains the maximum superiority using the correlation coefficient as the weight. That is, by using a sufficiently small range, it is possible to obtain the reference mass flow rate of water vapor, which is a threshold value for switching the set, and the value of each measuring device corresponding the reference mass flow rate. When the values obtained by f(1), f(2), and f(3) are used as samples, a threshold value for switching from one combination to another combination is given by using weights between the samples. In this case, the correspondence table illustrates the relationship between the threshold value and the set. Examples of the weight are not limited to this, and it is to take a midpoint of a confidence interval that overlaps the measured value (state quantity) from the measuring device (any one of first and second total pressure measuring devices Pg11 and Pg2$l$, first partial pressure measuring device Pg12, and the one second partial pressure measuring device Pg22) used by each measurement model, and this midpoint is indicated as a threshold value in the correspondence table.

As an example of other weights, the confidence intervals overlap the measured values by the measuring device used in each measurement model, the fluctuation amount (gradient) of the water vapor mass flow rate in this overlapping interval is the same (for example, ±5%), and in addition, the weight is set in consideration of ensuring the continuity of the determination of the water vapor mass flow rate. Specifically, uncertainty is compared for each measurement model to determine superiority or inferiority thereof. For example, the value is obtained by applying each of standard deviations of the first and second total pressure measuring devices Pg11 and Pg2$l$, the first partial pressure measuring device Pg12, and the one second partial pressure measuring device Pg22 to the correlation graph based on each f(1), f(2), and f(3) and dividing an amount of change by the standard deviation. Then, as illustrated in FIG. 3($b$), the measurement model is selected by comparing the value (vertical axis of FIG. 3($b$)) obtained by dividing the amount of change by the standard deviation with each water vapor mass flow rate (horizontal axis of FIG. 3(*b*)) and determining that the measurement model with a larger compared value has a higher S/N ratio. That is, an intersection is expressed as the threshold value in the correspondence table. Although not particularly illustrated and described, in f(2), a difference and a distance between the measured values of the one second partial pressure measuring device Pg22 and another second partial pressure measuring device Pg23 are used instead of the measured value by the one second partial pressure measuring device Pg22, in other words, when the measurement model and the measuring device are changed, it was confirmed that the variation was further reduced. It is also possible to include this improved set as f(4) in the distribution and continue to select the set that maintains the superiority from f(1) to f(4). In this example, f(n) is obtained by changing both the measurement model and the measuring device, but it is also possible to change or add only one of the measurement model and the measuring device to increase the number of sets to be selected. By increasing the number of sets in this way, it is possible to continue to select the set that maintains the superiority.

Figure 4:
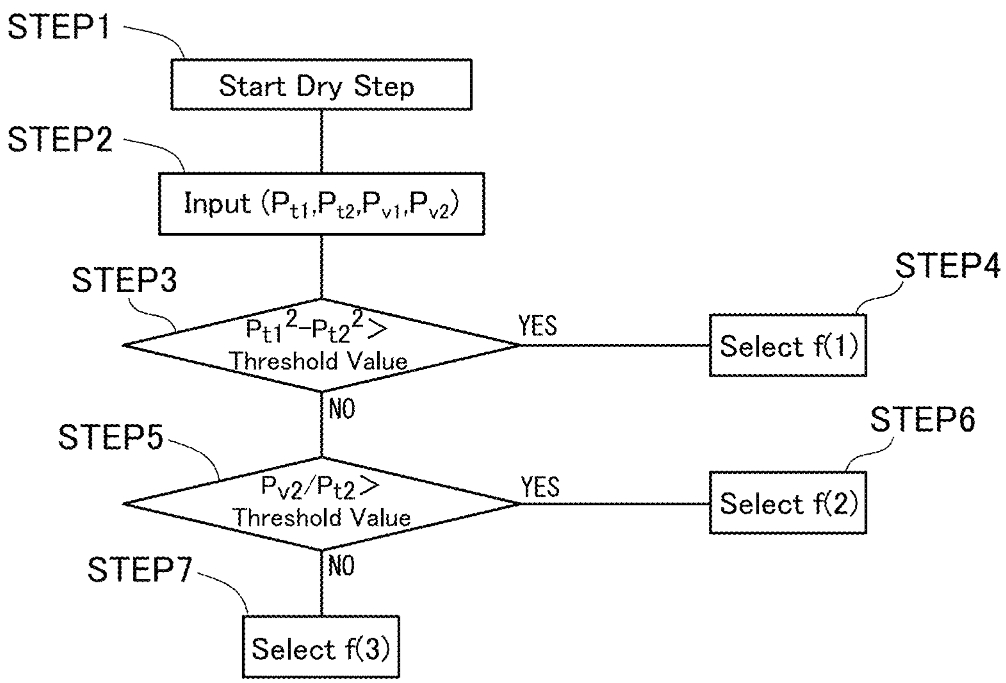
FIG. 4 is a flowchart schematically illustrating a flow of selection of a measurement model used for determining the water vapor mass flow rate.

Hereinafter, with reference to FIG. 4, a drying method of the present embodiment using the freeze-drying apparatus FM, specifically, during a freezing step of freezing the object to be dried Ds and a drying step of drying the frozen object to be dried Ds under a reduced pressure, a method of determining the water vapor mass flow rate, which is a control index of the dry state of the Ds to be dried, will be described. First, the plurality of containers Cm filled with the object to be dried Ds are placed on the respective shelf boards 3 in the freeze-drying chamber 1*a*. At this time, the on-off valve Cv is closed to isolate the freeze-drying chamber 1*a* and the collection chamber 2*a* from each other, and the refrigerator 42 is operated. Then, the heating/cooling mechanism built in each shelf board 3 is operated to cool the shelf board 3 to, for example, −3° C. to −6° C. As a result, the heat transfer from each of the cooled shelf boards 3 and the convection in the freeze-drying chamber 1*a* cool the object to be dried Ds filling the container Cm and put the object to be dried Ds in a frozen state.

Next, the on-off valve Cv is opened to allow the freeze-drying chamber 1*a* and the collection chamber 2*a* to communicate with each other, and then the drying step starts (STEP1). At the same time, the heating/cooling mechanism built into each shelf board 3 is operated to heat the upper surface of the shelf board 3. A heating temperature of the shelf board 3 is appropriately set according to the sublimation temperature of the moisture amount of the frozen object to be dried Ds, and is set to, for example, 5° C. to 40° C. Initially, the sublimation, that is, release of the water vapor is performed from the upper surface of the object to be dried Ds, but when the cake is formed, the water vapor is released in a state where a water vapor transmission rate of the cake is added. The object to be dried Ds is heated by each shelf board 3, the water vapor sublimated (vaporized) from the object to be dried Ds is condensed by the condensing pipe 41 in the collection chamber 2*a*, and the solidified solvent of the object to be dried Ds is dried. At this time, the total pressure and the partial pressures of water vapor $P_{t1}$, $P_{t2}$, $P_{v1}$, and $P_{v2}$ in the freeze-drying chamber 1*a* and the collection chamber 2*a* are measured by the measuring devices Pg11 to Pg23, and these measured values are input to the determining unit 5 (STEP2). Then, in the determining unit 5, from among the sets obtained by combining the measured values $P_{t1}$, $P_{t2}$, $P_{v1}$, $P_{v2}$ measured by the measuring devices Pg11 to Pg23 and f(1), f(2), and f(3) corresponding to the measured values are obtained, a set based on which the water vapor mass flow rate can be determined with superiority at the time of determination is selected.

Specifically, in the selection of this combination, it is determined whether a difference $P_{t1}^2-P_{t2}^2$ between a squared value $P_{t1}^2$ of the total pressure in the freeze-drying chamber 1*a* measured by the first total pressure measuring device Pg11 and a squared value $P_{t2}^2$ of the total pressure in the collection chamber 2*a* measured by the second total pressure measuring device Pg21 is larger than the threshold value existing in the correspondence table obtained in advance experimentally or by simulation as described above (STEP3), and when the difference is larger than the threshold value, the measured values $P_{t1}$ and $P_{t2}$ and the measurement model of f(1) corresponding to the measured values $P_{t1}$ and $P_{t2}$ are selected, and the water vapor mass flow rate is calculated (STEP4). In calculating the water vapor mass flow rate, Equation 1 may be used for output.

Meanwhile, when this difference is less than or equal to the threshold value, the determining unit 5 determines that the water vapor fraction (that is, a value $P_{v2}/P_{t2}$ obtained by dividing the water vapor partial pressure $P_{v2}$ in the collection chamber 2*a* measured by the second partial pressure measuring device Pg22 by the total pressure $P_{t2}$ of the collection chamber 2*a* measured by the second total pressure measuring device Pg21) in the collection chamber 2*a* is larger than the threshold value existing in the correspondence table obtained in advance experimentally or by simulation (STEP5). When the water vapor fraction $P_{v2}/P_{t2}$ is larger than the threshold value, the measured values $P_{t2}$ and $P_{v2}$ and the measurement model of f(2) corresponding to the measured values $P_{t2}$ and $P_{v2}$ are selected to calculate the water vapor mass flow rate (STEP6). Meanwhile, when this water vapor fraction $P_{v2}/P_{t2}$ is equal to or less than the threshold value, the measured values $P_{t1}$ and $P_{v1}$ and the measurement model of f(3) corresponding to the measured values $P_{t1}$ and $P_{v1}$ are selected to calculate the water vapor mass flow rate (STEP7). In calculating the water vapor mass flow rate, Equation 2 or Equation 3 may be used for output.

Figure 5:
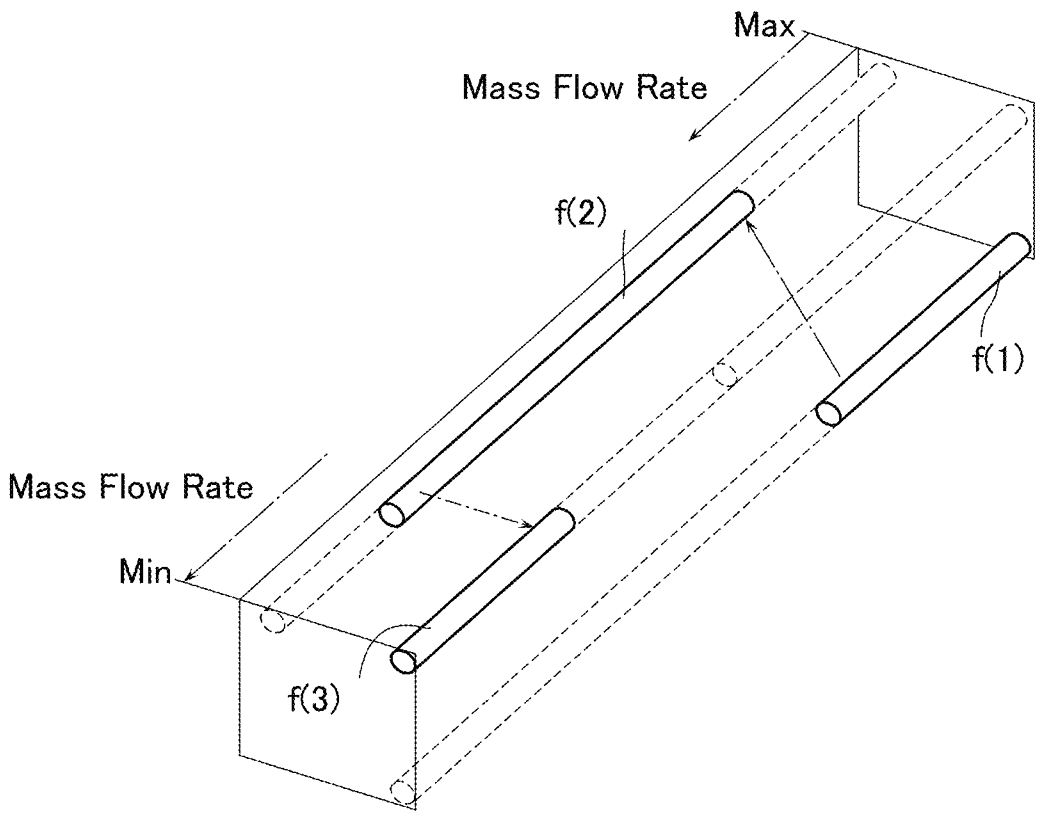
FIG. 5 is a conceptual diagram illustrating that a combination of measurement model selection and state quantity is selected according to the water vapor mass flow rate.

According to the above embodiment, in a process (situation) in which the water vapor mass flow rate decreases with the progress (progress of cake formation) of drying of the object to be dried Ds, as illustrated in FIG. 5, each time, from among the sets obtained by combining the measured values measured by each of the measuring devices Pg11 to Pg22 and the measurement models f(1), f(2), and f(3) corresponding to the measured values, the set based on which the water vapor mass flow rate can be determined with superiority at the time of the determination is selected, and thus, the water vapor mass flow rate can be continuously obtained with the required resolution for the measured value. Here, the distribution indicated by f(1), f(2), f(3) and the reference mass flow rate can be simulated as a prismatic space as illustrated in FIG. 5. A circular column in the prismatic space represents a sample which is a set of values obtained from the sets of the measured values obtained by determining the reference mass flow rate by each measuring device and the measurement models corresponding to the measured values. In FIG. 5, three circular columns are illustrated as a sample, but the number of measuring device and measurement models (i.e. observation targets) may be increased in order to enable more superior determination. For example, the distribution is a distribution with n×m samples (for example, reflecting the result of transforming Equation 4), where m is the number of measuring devices and n is the number of measurement models, and the numbers may be increased. For example, it may be illustrated that n×m circular columns are drawn in the prismatic space of FIG. 5, and in the example of this embodiment, the number of the measuring devices is 5 and the number of the measurement models is 3, and thus, 5×3, that is, the distribution may be a distribution in which a circular column with a sample number of 15 is drawn. In other words, in FIG. 5, it can be seen as an interpretation that the remaining 12 samples are drawn as non-illustration because there are three samples to be selected as a result of the superiority being already determined using the weights. For example, the correlation coefficient may be obtained for the entire area of the reference mass flow rate, and the sample illustrating a value above a certain level may be drawn as a circular column in FIG. 5

For the individual samples selected in this way, compare the correlation coefficients between the samples according to the range of the reference mass flow rate to confirm the superiority, or confirm the confidence interval according to the required specifications, and thus, confirm the superiority by taking the midpoint of overlapping confidence intervals between samples. In FIG. 5, dotted lines of the circular column are drawn as outside the confidence interval and solid lines thereof are drawn as inside the confidence interval, the superiority is determined using the above-mentioned weights, and the set based on which the water vapor mass flow rate can be determined with the superiority is drawn as dash-dotted arrows so that it can be continuously selected from Max to Min of the reference mass flow rate. Explaining from the Max side of the reference mass flow rate, a set of circular columns of the solid lines is initially selected, then another set is selected according to the dash-dotted arrows, and then when the reference mass flow rate approaches Min, it can be seen that another set is selected according to the dash-dotted arrows. When there are two circular columns of the solid lines illustrated as a set at a certain reference mass flow rate at the same time, for example, the samples having the superiority is selected by comparing the correlation coefficients between the samples, and the samples may be drawn so that the samples are connected by dash-dotted lines. Moreover, when the correlation coefficients are almost the same and the comparative superiority is poor, slopes of regression lines may be compared as weights, and a sample with high sensitivity may be selected. Further, when sensitivity is more important than correlation as the weight, the weight may be further added to the superiority or inferiority of the slope rather than the superiority or inferiority of the correlation. In this way, the superiority of the set in a certain range over the entire reference mass flow rate can be confirmed, and the measured value by each measuring device corresponding to the reference mass flow rate can also be confirmed. Accordingly, regardless of whether the quantity of the object to be dried Ds installed in the freeze-drying chamber is the rated value or about 1/1000, it is possible to continuously measure the water vapor mass flow rate until the end of the drying step of the object to be dried Ds, that is, from a high sublimation speed to a low sublimation speed.

As a result, the device (measuring device) for measuring the pressure and the partial pressure of the water vapor is installed in the freeze-drying chamber 1*a* and the collection chamber 2*a* in a simple method, and thus, it is possible to evenly determine the water vapor mass flow rate which is the control index of the dry state of the object to be dried Ds. Further, there is a concern that an error may occur because the surface state (particularly, the surface temperature) is changed (is not stable) with time due to the adhesion of water molecules to the condensing pipe 41 of the cold trap 4 which is the low temperature surface. However, as described above, since the first and second total pressure measuring devices Pg11 and Pg21, the first partial pressure measuring device Pg12, and the second partial pressure measuring devices Pg22 and Pg23 are installed, the above-described problem does not occur. Further, when the two second partial pressure measuring devices Pg22 and Pg23 for measuring the partial pressure of the water vapor are provided at predetermined positions where a partial pressure difference of 50% or more is generated, the number of measuring device to be similarly installed can be minimized. In the present embodiment, the two second partial pressure measuring devices Pg22 and Pg23 are each disposed in the collection chamber 2*a* where the partial pressure difference of 50% or more occurs, and thus, no further partial pressure measuring device is required to measure the partial pressure of water vapor, in other words, the number of measuring devices can be optimized by observing the difference of 50% or more. With this configuration, the distribution acquired in advance can be made a necessary and sufficient distribution without making it redundant.

Although the embodiments of the present invention are described above, the present invention is not limited to the above, and can be appropriately modified without departing from the technical idea of the present invention. In the above embodiment, the example is described in which the freeze-drying chamber 1 and the collection chamber 2 are connected via the connection pipe Cp, but the present invention is not limited to this, and the present invention can be applied even when the freeze-drying chamber and the collection chamber are substantially constituted by one chamber. Here, "the total pressure is different" means that the space from the low temperature surface to the source of water vapor contains the conductance (resistance). However, even when it is substantially constituted by one chamber, in the shelf on which the container such as the vial is placed, a portion which is in close contact with the low temperature surface has the conditions that control the conductance, and thus, the separation can be performed by this portion. Even when the determining unit measures the same physical quantity, by disposing the determining unit in this way, the measurement can be performed in the region in which the physical phenomena are different, and as a result, the number and arrangement of the measuring devices can be optimized. This optimization is the optimization of the distribution acquired in advance, and the distribution can be optimized by considering the optimization especially when performing the simulation. That is, by evaluating the distribution in advance using the weight, the freeze-drying apparatus FM can be provided with the optimized freeze-drying method capable of evenly determining the water vapor mass flow rate, which is a control index of the dry state of the object to be dried Ds.

Further, in the above embodiment, the first partial pressure measuring device Pg12 and the second partial pressure measuring devices Pg22 and Pg23 are disposed to be divided into the freeze-drying chamber 1*a* and the collection chamber 2*a* having different total pressures in the drying step. However, the present invention is not limited to this, as long as the advection and diffusion state (mass fraction or volume fraction of water vapor) of the water vapor are different from each other under the same pressure, it is also possible to determine the water vapor mass flow rate using the mass fraction or the volume fraction of water vapor. Further, in the above embodiment, the example is described in which two values measured by any one of the first and second total pressure measuring device Pg11 and Pg2*l*, the first partial pressure measuring device Pg12, and the second partial pressure measuring devices Pg22 and Pg22 are input to each measurement model (theoretical equation). However, the present invention is not limited to this, and when the water vapor mass flow rate is very low, the input value of Equation 3 may be single (only the partial pressure of the water vapor measured by the first partial pressure measuring device Pg12). In particular, when the specifications are made such that the required determination range is widened and the accuracy is higher, the number of measurement points corresponding to the advection and diffusion state of the water vapor, that is, the number of measuring devices increases, and thus, the order may be increased after considering the optimization of the distribution space. By increasing the distribution space in this way, it is possible to determine the superiority of the set having a wider determination range and higher accuracy.

Further, in the above embodiment, the example is described in which the state quantity is the pressure and the partial pressure of the water vapor, but as one used in the mathematical model, for example, a partial pressure of a compensating gas can be used. Further, it is also possible to provide a measuring device for measuring the weight of the shelf board on which the object to be dried is placed in the freeze-drying chamber, and use this measuring device as the measuring device. Further, it is also possible to provide a measuring device for measuring a weight of a portion of the object to be dried Ds or a dummy object to be dried Ds that imitates the object to be dried Ds, and use this measuring device as the measuring device. In this case, a measurement model using weight is also added, and by adding the samples obtained from these sets to the distribution, it is possible to perform determination with further superiority. In order to obtain further superiority by adding different state quantities from the same viewpoint, the temperature of the object to be dried Ds and the infrared spectroscopic absorption amount at any location in the freeze-drying apparatus are measured, and a sample obtained from a set with the corresponding measurement model may be added to the distribution.

REFERENCE SIGNS LIST

FM Freeze-drying apparatus
Ds Object to be dried
1*a* Freeze-drying chamber (an internal space)
2*a* Collection chamber (an internal space)
4 Cold trap
Pg11, Pg21 Capacitance manometer (measuring device)
Pg12, Pg22, Pg23 Mass spectrometer (measuring device)
Control unit (determining unit).

The invention claimed is:

1. A freeze-drying apparatus comprising:

a freeze-drying chamber in which an object to be dried using water as a solvent is disposed;

a collection chamber provided with a cold trap which communicates with the freeze-drying chamber to condense and collect water vapor generated from the object to be dried;

a plurality of measuring devices which measure a state quantity of at least one of the object to be dried, an inside of the freeze-drying chamber, and an inside of the collection chamber according to sublimation of the water vapor from the object to be dried; and a determining unit which determines a water vapor mass flow rate based on the state quantity measured by each measuring device, wherein the determining unit has a plurality of measurement models performed to observe the water vapor mass flow rate, and while each measuring device measures the state quantity, from among sets obtained by combining a measured value measured by each measuring device and each measurement model corresponding to the measured value, a set based on which the water vapor mass flow rate is determined with superiority at a time of determination is selected, and the water vapor mass flow rate is obtained from this a selected measured value and each measurement model corresponding to the selected measured value.

2. The freeze-drying apparatus according to claim 1, wherein the state quantity includes a partial pressure of the water vapor, and a measuring device for measuring the partial pressure of water vapor is provided at two or more locations at least one of the freeze-drying chamber and the collection chamber at intervals.

3. The freeze-drying apparatus according to claim 2, wherein each of the measuring devices for measuring the partial pressure of the water vapor is provided in at least one of the freeze-drying chamber and the collection chamber in a range in which a total pressure is different from each other.

4. The freeze-drying apparatus according to claim 2, wherein each of the measuring devices for measuring the partial pressure of the water vapor is provided at a predetermined position where a partial pressure difference of 50% or more is generated.

5. The freeze-drying apparatus according to claim 2, wherein each of the measuring devices for measuring the partial pressure of the water vapor is provided in a region where an initial mass fraction is 1 and the mass fraction decreases thereafter.

6. A freeze-drying method comprising:

a freezing step of disposing an object to be dried using water as a solvent in a freeze-drying chamber and cooling the object to be dried to solidify the solvent from a liquid phase to a solid phase; and a drying step of sublimating the solidified solvent from the solid phase to a gas phase, wherein the drying step further includes a step of measuring a state quantity of at least one of the object to be dried, an inside of the freeze-drying chamber, and an inside of the collection chamber according to sublimation of water vapor from the object to be dried using a plurality of measuring devices and determining a water vapor mass flow rate using a determining unit based on the state quantity measured by each measuring device, and the determining unit has a plurality of measurement models performed to observe the water vapor mass flow rate in advance, and while each measuring device measures the state quantity, from sets obtained by combining a measured value measured by each measuring device and each measurement model corresponding to the measured value, a set based on which the water vapor mass flow rate is determined with superiority at a time of determination is selected, and the water vapor mass flow rate is obtained from a selected measured value and each measurement model corresponding to the selected measured value.

7. The freeze-drying method according to claim 6, wherein a partial pressure of the water vapor is used as the state quantity, and the partial pressure of the water vapor is obtained by a plurality of measuring devices provided at two or more locations at least one of the freeze-drying chamber and the collection chamber at intervals.

* * * * *